United States Patent
Minkwitz

(10) Patent No.: US 9,701,813 B2
(45) Date of Patent: Jul. 11, 2017

(54) WEATHERING-STABILIZED ACRYLONITRILE COPOLYMER MOLDING COMPOSITIONS

(75) Inventor: Rolf Minkwitz, Dortmund (DE)

(73) Assignee: INEOS Styrolution Europe GmbH, Frankfurt (DE)

( * ) Notice: Subject to any disclaimer, the term of this patent is extended or adjusted under 35 U.S.C. 154(b) by 1116 days.

(21) Appl. No.: 13/169,395

(22) Filed: Jun. 27, 2011

(65) Prior Publication Data

US 2012/0007283 A1   Jan. 12, 2012

Related U.S. Application Data

(60) Provisional application No. 61/433,537, filed on Jan. 18, 2011.

(30) Foreign Application Priority Data

Jul. 12, 2010  (EP) .................................... 10169243
Jul. 12, 2010  (EP) .................................... 10169245

(Continued)

(51) Int. Cl.
*C08L 33/20* (2006.01)
*C08K 5/16* (2006.01)
(Continued)

(52) U.S. Cl.
CPC ................. *C08K 5/16* (2013.01); *C08K 5/34* (2013.01); *C08K 5/315* (2013.01)

(58) Field of Classification Search
CPC  C08L 25/08; C08L 25/12; C08K 5/34; C08K 5/16
(Continued)

(56) References Cited

U.S. PATENT DOCUMENTS 4,224,419 A   9/1980 Swoboda et al.
4,331,586 A   5/1982 Hardy
(Continued)

FOREIGN PATENT DOCUMENTS

CN   1201052 A   12/1998
DE   28 26 925   1/1980
(Continued)

OTHER PUBLICATIONS

Machine translation of JP 2005068426 A, 2005.*
(Continued)

*Primary Examiner* — Wenwen Cai
(74) *Attorney, Agent, or Firm* — Drinker Biddle & Reath LLP

(57) ABSTRACT

The present invention relates to a thermoplastic molding composition comprising
a) 77.7% to 99.7% by weight of one or more styrene copolymers, as component A
b) 0.1% to 5% by weight of the compounds of the formulae I, II, III, IV, and V, or isomers thereof, as component B:

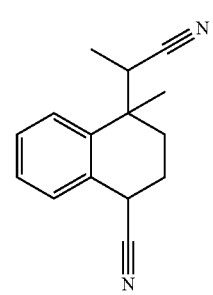

(I)

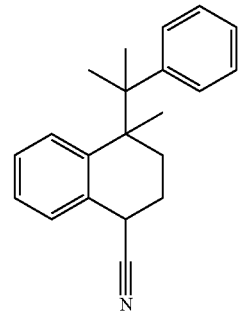

(II)

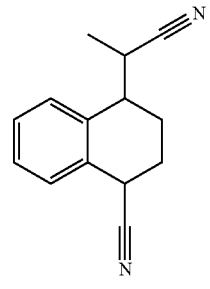

(III)

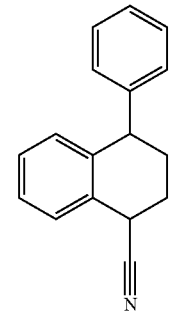

(IV)

(Continued)

-continued
(V)
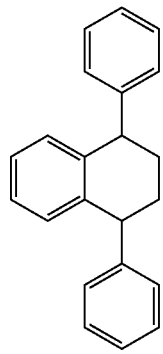
(IX)
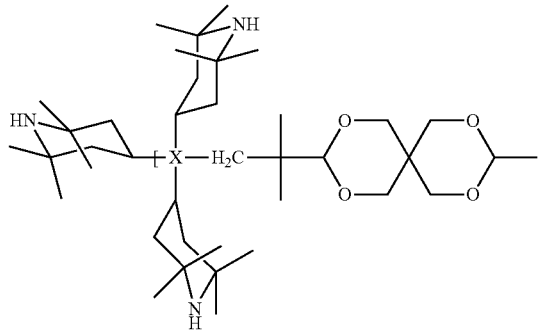
c) 0.2% to 0.7% by weight of a compound of the formula (VI), as component C:
(VI)
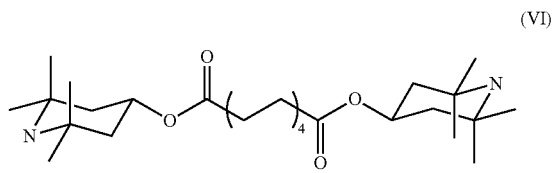
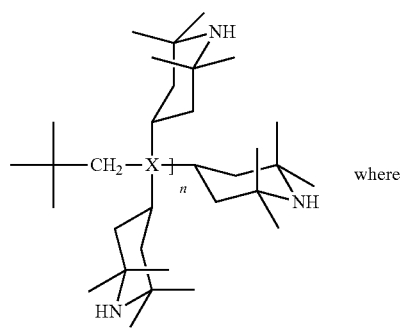
where
d) 0.2% to 0.7% by weight of a mixture of the formula (VII), as component D:
(VII)
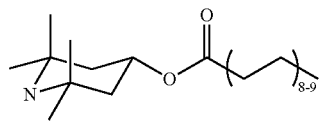
X =
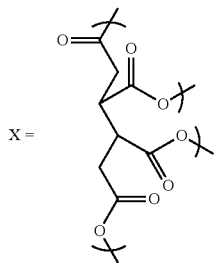
e) 0% to 0.5% by weight of a compound of the formula (VIII) as component E:
or 0% to 0.5% by weight of a compound of the formula (X):
(VIII)
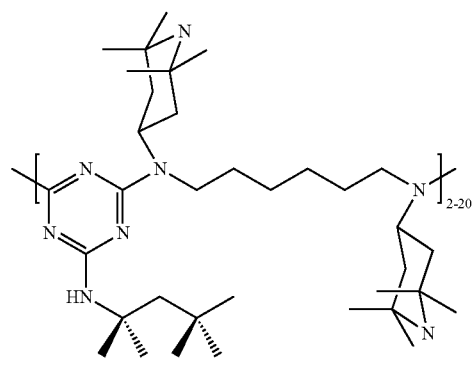
(X)
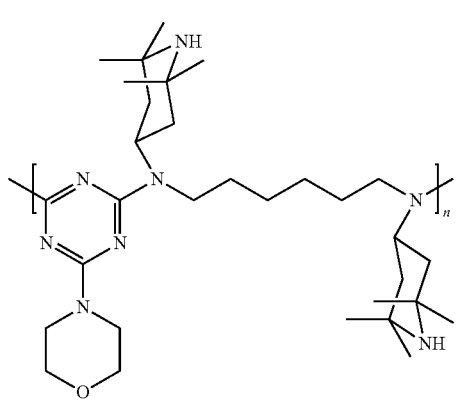

or 0% to 0.5% by weight of a compound of the formula (XI):

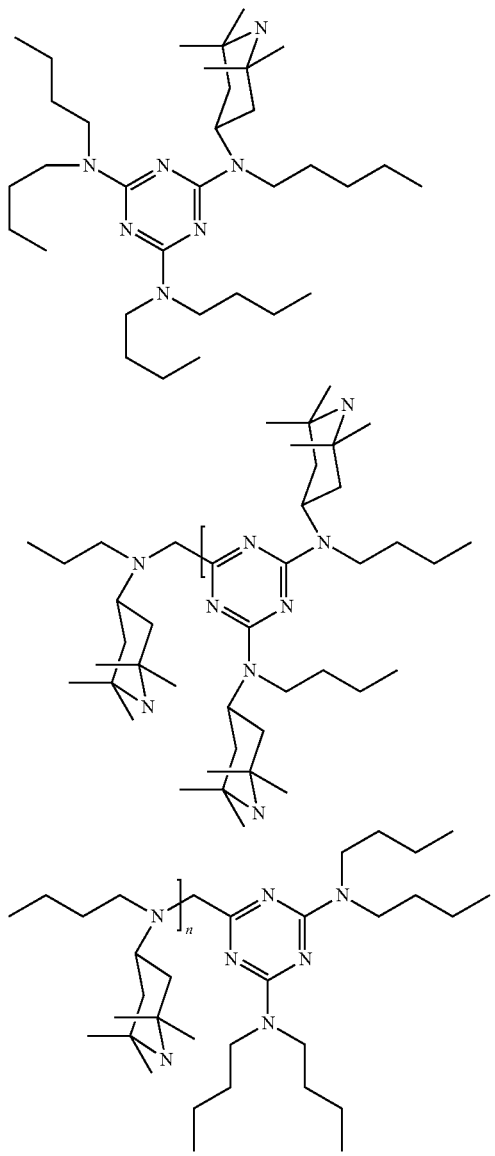

(XI)

f) 0% to 10% by weight of one or more additives which are different from components B, C, D, and E, as component F, and the percentage by weight being based in each case on the total weight of components A to F and together making up 100% by weight.

8 Claims, No Drawings

(30) Foreign Application Priority Data

Jul. 12, 2010 (EP) .................................... 10169250
Jul. 12, 2010 (EP) .................................... 10169257

(51) Int. Cl.
  *C08K 5/34* (2006.01)
  *C08K 5/315* (2006.01)

(58) Field of Classification Search
  USPC .......................................... 524/99, 100, 102
  See application file for complete search history.

(56) References Cited

U.S. PATENT DOCUMENTS

| | | |
|---|---|---|
| 4,396,769 A | 8/1983 | Ferreira et al. |
| 4,492,791 A | 1/1985 | Orban et al. |
| 4,605,699 A | 8/1986 | Mitulla et al. |
| 4,634,734 A | 1/1987 | Hambrecht et al. |
| 4,692,486 A | 9/1987 | Gugumus |
| 4,957,953 A | 9/1990 | Kikkawa et al. |
| 5,196,480 A | 3/1993 | Seitz et al. |
| 5,208,132 A | 5/1993 | Kamada et al. |
| 2003/0181583 A1 | 9/2003 | Duijzings et al. |
| 2003/0225191 A1 | 12/2003 | Gugumus |
| 2004/0006178 A1 | 1/2004 | Nagahara et al. |

FOREIGN PATENT DOCUMENTS

| | | |
|---|---|---|
| DE | 3149357 A1 | 6/1983 |
| DE | 3227555 A1 | 1/1984 |
| DE | 3414118 A1 | 10/1985 |
| DE | 103 16 198 A1 | 10/2003 |
| EP | 93 693 A2 | 11/1983 |
| EP | 0099532 A2 | 2/1984 |
| EP | 0450485 A2 | 10/1991 |
| EP | 534212 A1 | 3/1993 |
| EP | 782 994 A1 | 7/1997 |
| GB | 1124911 | 8/1968 |
| JP | S5352560 A | 5/1978 |
| JP | 02004346237 A | 12/2004 |
| JP | 2005068426 A * | 3/2005 |
| WO | WO-02/10222 A1 | 2/2002 |
| WO | WO-2008/031719 A1 | 3/2008 |

OTHER PUBLICATIONS

Kirchner et al., The formation of oligomers in the thermal copolymerization of the styrene/acrylonitrile-system, Makronol. Chem. 177, 2031-2042, 1976.*
National Toxicology Program, Executive summary styrene-acrylonitrile trimer (SAN trimer), 1999.*
U.S. Appl. No. 13/169,368, filed Jun. 27, 2011, Minkwitz.
U.S. Appl. No. 13/169,381, filed Jun. 27, 2011, Minkwitz.

* cited by examiner

WEATHERING-STABILIZED ACRYLONITRILE COPOLYMER MOLDING COMPOSITIONS

RELATED APPLICATIONS

This Application claims priority to European Application 10169243.2 filed on Jul. 12, 2010, European Application 10169245.7 filed on Jul. 12, 2010 European Application 10169250.7 filed on Jul. 12, 2010, European Application 10169257.2 filed on Jul. 12, 2010 in European Patent Office. This Application also claims the benefit of U.S. Provisional Application 61/433,537 filed on Jan. 18, 2011 which are all incorporated by reference.

The present invention pertains to thermoplastic molding compositions comprising high-gloss, weathering-resistant acrylonitrile copolymers, more particularly for automobile exterior applications.

Stabilized thermoplastic molding compositions of a very wide variety of kinds are known and can be broadly employed on the basis of their profile of properties, which is favorable for numerous applications.

For example, U.S. Pat. No. 4,877,826 describes weatherable styrene polymer blends of grafted EPDM and/or acrylate rubbers in styrene-acrylonitrile copolymers that are stabilized with polyalkyl glycol. Disadvantages with this embodiment are the low initial gloss and the low weathering resistance.

U.S. Pat. No. 5,580,928 discloses mixtures of maleic anhydride-olefin copolymers and styrene-acrylonitrile copolymers for the automobile exterior area. Disadvantages of this embodiment are the severe yellowing of the molding compositions and their low weathering stability.

U.S. Pat. No. 4,692,486 discloses stabilizer mixtures comprising compounds of the formulae (VI) and (VIII) of the present specification for polypropylene, polyurethane, and polystyrene, the amounts of the individual stabilizer components that are used being less than or equal to 0.1% by weight.

DE-A-103 16 198 discloses stabilizer mixtures for any of a very wide variety of kinds of thermoplastic polymers, with polypropylene being emphasized as an example. The stabilizer mixtures are ternary mixtures. For the three components of this stabilizer mixture, a multiplicity of possible generic and specific compounds is described in each case. As merely one of many possibilities, the stabilizer mixtures described include mixtures which also comprise compounds of the formulae (VI), (VII) and (VIII) of the present specification. Each of the three stabilizer components in the mixture can be present preferably in amounts of 0.05% to 1% by weight, based on the organic material. Disadvantages of this embodiment are the severe color change during weathering, and the decrease in the gloss.

It was an object of the present invention, therefore, to provide improved high-gloss molding compositions based on acrylonitrile copolymers.

Found accordingly have been new and improved thermoplastic molding compositions comprising:
  a) 0% to 99.7% by weight of one or more styrene copolymers, as component A
  b) 0.1% to 10% by weight of the compounds of the formulae I, II, III, IV, and V, or isomers thereof, as component B:

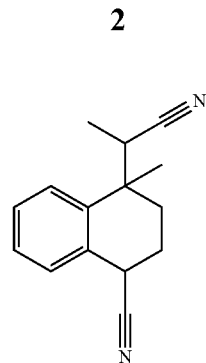

(I)

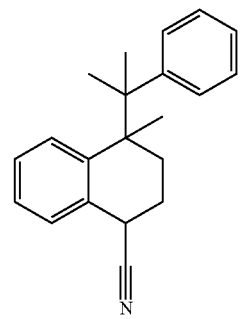

(II)

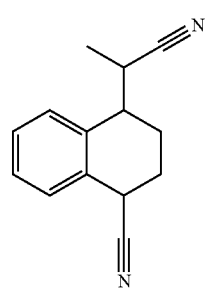

(III)

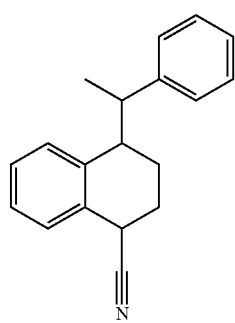

(IV)

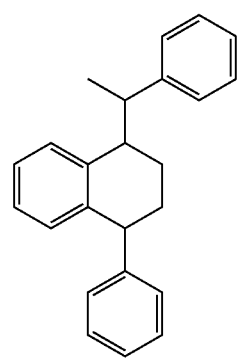

(V)

c) 0.2% to 0.9% by weight of a compound of the formula (VI), as component C:
(VI)
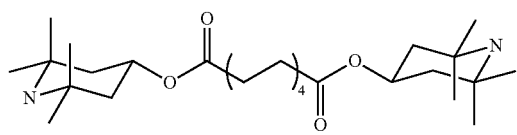
d) 0% to 0.9% by weight of a mixture of the formula (VII), as component D:
(VII)
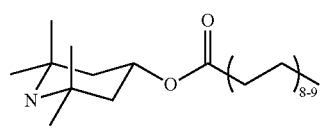
e) 0% to 0.5% by weight of a compound of the formula (VIII) as component E:
(VIII)
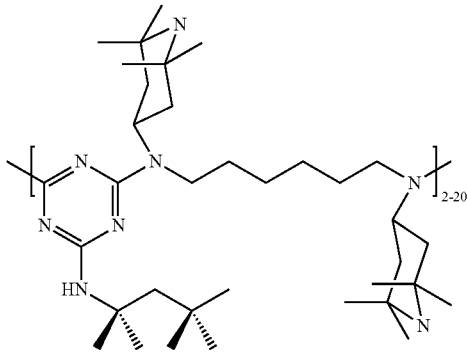
or 0% to 0.5% by weight of a compound of the formula (IX):
(IX)
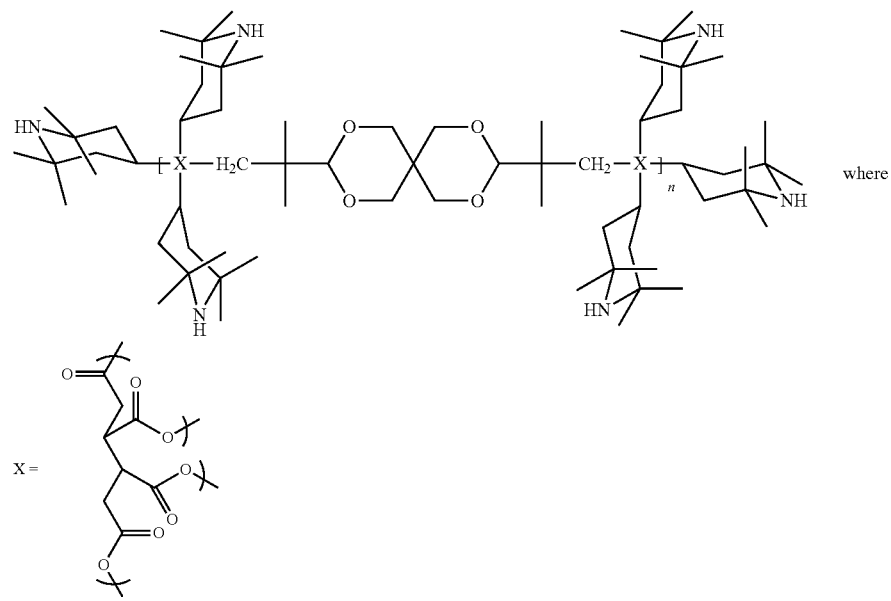 where
or 0% to 0.5% by weight of a compound of the formula (X).
(X)
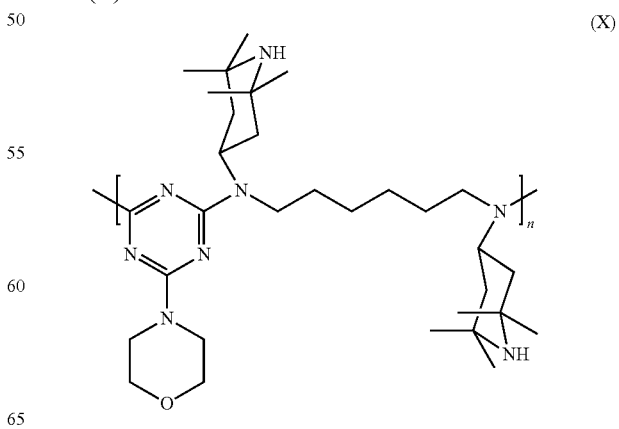
or 0% to 0.5% by weight of a compound of the formula (XI):

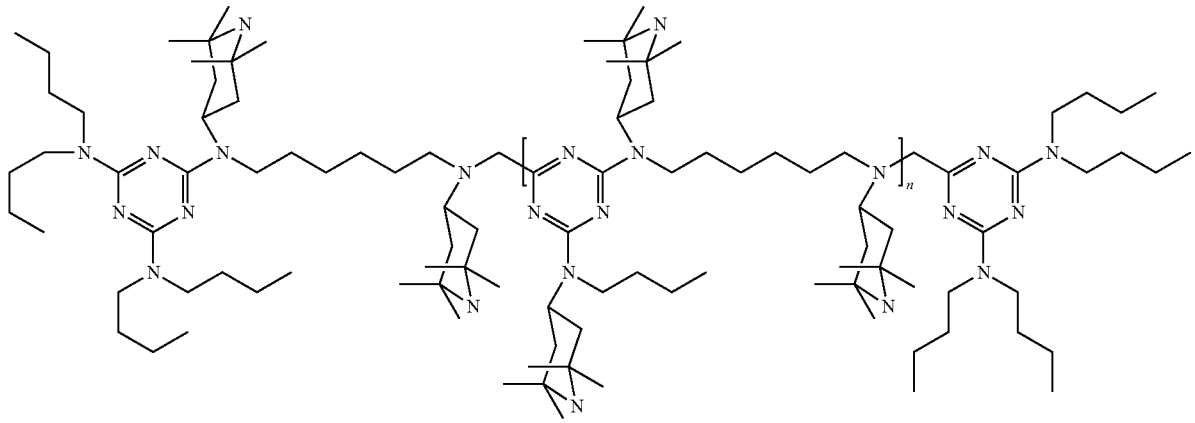

(XI)

f) 0% to 10% by weight of one or more additives which are different from components B, C, D, and E, as component F, and with the proviso that, if component D amounts to 0% by weight, component E amounts to 0.01% to 0.5%, preferably 0.1% to 0.5%, more preferably 0.27% to 0.5% by weight of one or more of the compounds VIII, IX, X, or XI, the percentage by weight being based in each case on the total weight of components A to F and together making up 100% by weight.

As a result of the selection of each individual component and of its proportions, the molding compositions of the invention, relative to the known stabilized molding compositions, have a further-improved weathering resistance, i.e., a further-improved heat, light and/or oxygen resistance.

The articles, processes, and uses of the invention are described hereinbelow.

The molding compositions of the invention comprise, based on the total weight of components A, B, C, D, E, and F, which makes up a total of 100% by weight,
a) 77.7% to 99.7%, preferably 80% to 99.2%, more preferably 96.2% to 99.2% by weight of component A
b) 0.1% to 10%, preferably 0.1% to 5%, more preferably 0.2% to 2% by weight of component B,
c) 0.2% to 0.9%, preferably 0.2% to 0.7%, more preferably 0.2% to 0.6% by weight of component C,
d) 0% to 0.9%, preferably 0.2% to 0.7%, more preferably 0.2% to 0.4% by weight of component D, with the proviso that, if component D amounts to 0% by weight (i.e., there is no component D present), component E amounts to 0.01% to 0.5%, preferably 0.1% to 0.5%, more preferably 0.2% to 0.5% by weight of one of the compounds VIII, IX, X or XI,
e) 0% to 0.5%, preferably 0.1% to 0.5%, more preferably 0.2% to 0.4% by weight of component E, and
f) 0% to 10%, preferably 0% to 8%, more preferably 0%, to 5% by weight of component F.

The weight ratio of component C to component D is generally in the range from 4:1 to 0.25:1, preferably 4:1 to 1:1, more preferably 3:1 to 1:1.

The weight ratio of component D to E is generally in the range from 2:1 to 0.5:1.

Component A:

As component A, the thermoplastic molding compositions of the invention comprise one or more acrylonitrile copolymers. In the copolymers, in addition to acrylonitrile, there may be any desired suitable comonomers present. The copolymer is preferably a styrene-acrylonitrile copolymer, an alpha-methylstyrene-acrylonitrile copolymer, an N-phenylmaleimide-styrene copolymer or N-phenylmaleimide-styrene-acrylonitrile terpolymer.

As component A it is possible in principle to use all of the copolymers, known to the skilled person and described in the literature, that are as follows: styrene-acrylonitrile copolymers, α-methylstyrene-acrylonitrile copolymers, N-phenylmaleimide-styrene-acrylonitrile terpolymer or mixtures thereof, provided such mixtures have a viscosity number VN (measured in accordance with DIN 53727 at 25° C. in the form of a 0.5% strength by weight solution in dimethylformamide; this measurement method also applies to all viscosity numbers VN specified below) of less than or equal to 85 ml/g.

Preferred components A are synthesized from 50% to 90%, preferably 60% to 85%, more particularly 65% to 81% by weight of styrene and 10% to 50%, preferably 20% to 40%, more particularly 19% to 35% by weight of acrylonitrile, and also from 0% to 5%, preferably 0% to 4%, more particularly 0% to 3% by weight of further monomers, the weight percentages being based in each case on the weight of component A and together making up 100% by weight.

Additionally preferred components A are synthesized from 50% to 90%, preferably 60% to 80%, more particularly 65% to 78% by weight of α-methylstyrene and 10% to 50%, preferably 20% to 40%, more particularly 22% to 35% by weight of acrylonitrile, and also from 0% to 5%, preferably 0% to 4%, more particularly 0% to 3% by weight of further monomers, the weight percentages being based in each case on the weight of component A and together making up 100% by weight.

Likewise preferred components A are synthesized from 50% to 90%, preferably 60% to 80%, more particularly 65% to 78% by weight of N-phenylmaleimide and 10% to 50%, preferably 20% to 40%, more particularly 22% to 35% by weight of styrene and acrylonitrile, respectively, and also from 0% to 5%, preferably 0% to 4%, more particularly 0% to 3% by weight of further monomers, the weight percentages being based in each case on the weight of component A and together making up 100% by weight.

Likewise preferred components A are mixtures of these styrene-acrylonitrile copolymers, α-methylstyrene-acrylonitrile copolymers, N-phenylmaleimide-styrene copolymers, and N-phenylmaleimide-acrylonitrile-styrene terpolymers.

As further monomers specified above it is possible to employ all copolymerizable monomers such as, for example, p-methylstyrene, tert-butylstyrene, vinylnaphthalene, alkyl acrylates and/or alkyl methacrylates, examples being those having $C_1$- to $C_8$-alkyl radicals, N-phenylmaleimide or mixtures thereof.

The copolymers of component A can be prepared by known methods. They are preparable, for example, by radical polymerization, more particularly by emulsion, suspension, solution or bulk polymerization.

Component B:

As component B, the thermoplastic molding compositions of the invention comprise one or more compounds of the formulae (I), (II), (III), (IV) and/or (V).

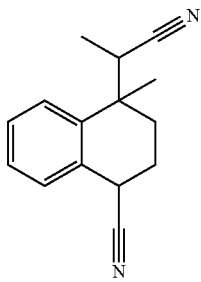
(I)

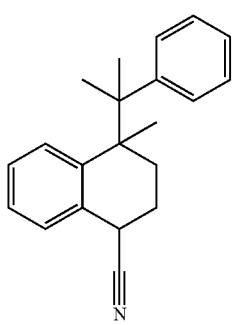
(II)

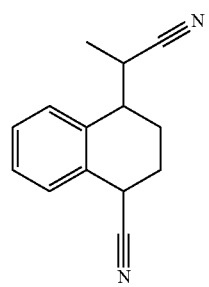
(III)

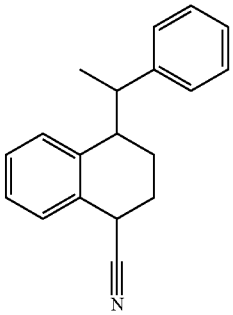
(IV)

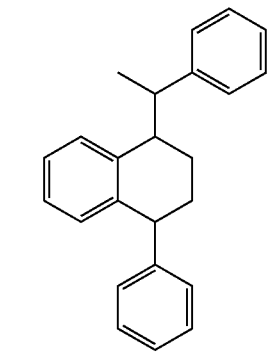
(V)

These compounds can be prepared with the aid of a co-reagent of acrylonitrile with styrene and/or α-methylstyrene. Their preparation is known to the skilled person and described in the literature (Schellenberg et al., Makromolekulare Chemie (1992), 193, 3063-3071). They can also be obtained in a continuously operated bulk/solution polymerization of styrene and/or α-methylstyrene from the reverse monomer/solvent mixture (Schellenberg et al., Angewandte Makromolekulare Chemie (1991), 3138, 123-134)

Component C:

As component C of the molding compositions of the invention, a compound of the formula (VI) is used:

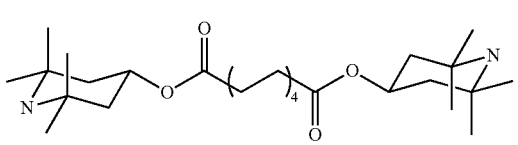
(VI)

This sterically hindered amine (CAS Number 52829-07-9) and its preparation are known to the skilled person and described in the literature (see, for example, U.S. Pat. No. 4,396,769 and the literature references cited therein). It is sold by BASF SE under the Tinuvin® 770 name.

Component D:

As component D of the molding compositions of the invention, a mixture of the formula (VII) is used:

(VII)

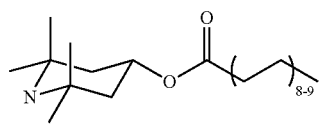

This sterically hindered amine (CAS Number 167078-06-0) and its preparation from 2,2,6,6-tetramethyl-4-piperinol and stearic and/or palmitic acid are known to the skilled person and described in the literature (Carlsson et al., Can. Journal of Polymer Science, Polymer Chemistry Edition (1982), 20(2), 575-82). It is sold by Cytec Industries under the Cyasorb® 3853 name.

Component E:

As component E of the molding compositions of the invention, it is possible to use a compound of the formula (VIII):

(VIII)

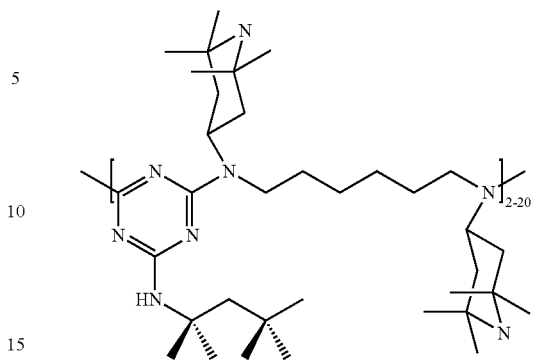

This sterically hindered amine (CAS Number 71878-19-8) and its preparation are known to the skilled worker and described in the literature (see, for example, EP-A-93 693 and the literature references cited therein). It is sold by BASF SE under the Chimassorb® 944 name.

As a further component E of the molding compositions of the invention, it is possible to use a compound of the formula (IX):

(IX)

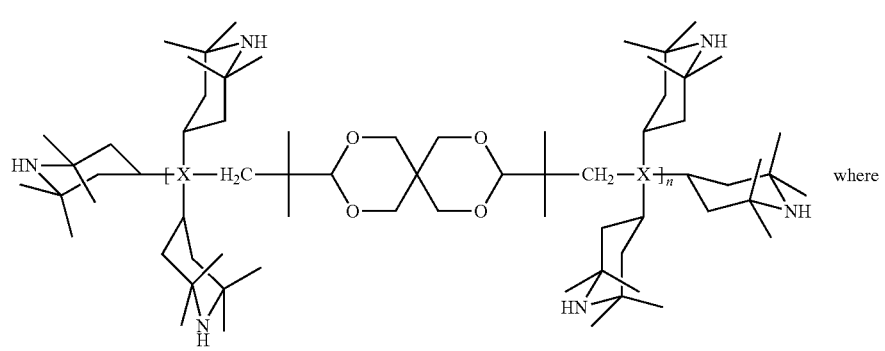 where

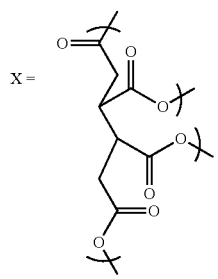

X =

This sterically hindered amine (CAS Number 101357-37-3) and its preparation are known to the skilled worker and described in the literature (see, for example, U.S. Pat. No. 5,208,132 and the literature references cited therein). It is sold by ADEKA under the Adeka Stab® LA-68 name.

As a further component E of the molding compositions of the invention, it is possible to use a compound of the formula (X):

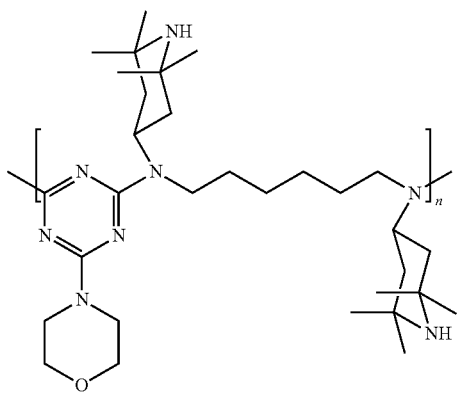

(X)

This sterically hindered amine (CAS Number 82451-48-7) and its preparation are known to the skilled worker and described in the literature (see, for example, U.S. Pat. No. 4,331,586 and the literature references cited therein). It is sold by Cytec Industries under the Cyasorb® UV-3346 name.

As a further component E of the molding compositions of the invention, it is possible to use a compound of the formula (XI):

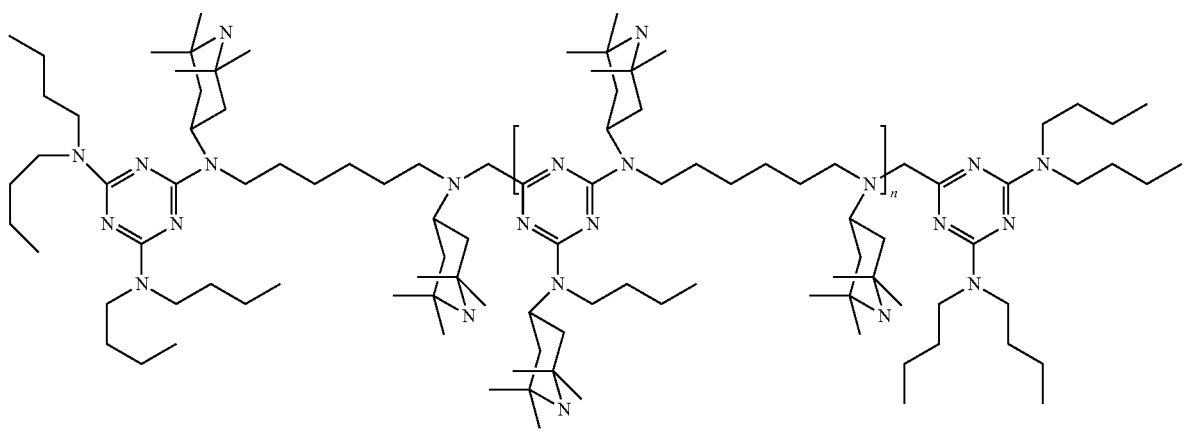

(XI)

This sterically hindered amine (CAS Number 192268-64-7) and its preparation are known to the skilled worker and described in the literature (see, for example, EP-A-782 994 and the literature references cited therein). It is sold by BASF under the Chimassorb® 2020 name.

Component F:

Besides components A, B, C, D, and E, the molding compositions of the invention may comprise one or more additives or adjuvants, different from components C, D, and E, that are customary and typical for plastics mixtures.

Examples of such additives and adjuvants include the following: dyes, pigments, colorants, antistats, antioxidants, stabilizers for improving the heat stability, for enhancing the light stability, for raising the hydrolysis resistance and the chemical resistance, agents which act against thermal decomposition, and, more particularly, the lubricants which are useful for the production of moldings or shaped articles. These further adjuvants may be metered in at any stage in the production operation, but preferably at an early point in time, in order for the stabilizing effects (or other special effects) of the adjuvant to be utilized at an early stage. Heat stabilizers and antioxidants are typically metal halides (chlorides, bromides, iodides) deriving from metals from group I of the Periodic Table of the Elements (such as Li, Na, K, Cu).

Stabilizers suitable as component F are the customary hindered phenols, but also vitamin E and compounds of analogous construction. Additionally, benzophenones, resorcinols, salicylates, benzotriazoles, and other compounds are suitable. They are used typically in amounts of 0% to 2%, preferably 0.01% to 2%, by weight (based on the total weight of the molding compositions of the invention).

Suitable lubricants and mold release agents are stearic acids, stearyl alcohol, stearic esters, and, generally, higher fatty acids, derivatives thereof, and corresponding fatty acid mixtures with 12 to 30 carbon atoms. The amounts of these additions—where present—lie in the range from 0.05% to 1% by weight (based on the total weight of the molding compositions of the invention).

Also contemplated as adjuvants are silicone oils, oligomeric isobutylene or similar substances; the typical amounts—where present—are 0.05% to 5% by weight (based on the total weight of the molding compositions of the invention). Pigments, dyes, color brighteners, such as ultramarine blue, phthalocyanines, titanium dioxide, cadmium sulfides, and derivatives of perylenetetracarboxylic acid, can likewise be used.

Processing assistants and stabilizers, lubricants and antistats are used typically in amounts of 0% to 2%, preferably 0.01% to 2%, by weight (based on the total weight of the molding compositions of the invention).

The molding compositions of the invention can be produced from the components in any desired way in accordance with any of the known methods. It is preferred, however, that the components are blended by melt mixing, examples being conjoined extruding, kneading or rolling of the components, at temperatures, for example, in the range from 160 to 400° C., preferably from 180 to 280° C., with the components, in one preferred embodiment, having been isolated wholly or partly beforehand from the reaction mixtures obtained in the respective preparation steps.

The molding compositions of the invention can be processed to foils or moldings. These foils or moldings are suitable more particularly for use in the automotive exterior area, i.e., under effects of weathering.

These foils or moldings can be produced from the molding compositions of the invention in accordance with the known techniques of thermoplastics processing. More particularly, they may be produced by extrusion or by injection molding.

As compared with the known stabilized molding compositions, the molding compositions of the invention exhibit a further-improved weathering resistance, i.e., a further-improved heat, light and/or oxygen resistance.

The invention is elucidated in more detail by reference to the following examples.

EXAMPLES

Measurement Methods:

As a measure of the weathering resistance, test specimens (60×60×2 mm, produced in accordance with ISO 294 in a family mold at a melt temperature of 260° C. and a mold temperature of 60° C.) were subjected to Xenontest weathering in accordance with ISO 4892/2, method A, exterior. Following the weathering times specified in Table 1, the surface gloss of all of the samples was measured in accordance with DIN 67530 from a 60° viewing angle.

Change in the Color Space ΔE:

As a further measure of the weathering resistance, the change in the color space ΔE according to DIN 52 336 was calculated from ΔL, ΔA and ΔB in accordance with DIN 6174.

Starting Materials

Components or products with a preceding "C-" are not inventive, and serve for comparison.

As component A (or C-A for comparison), the following were used:

A-i: a styrene-acrylonitrile copolymer with 35% acrylonitrile (CAS Number 107-13-1) and 65% styrene (CAS Number 100-42-5) having a molecular weight of 104 000 as measured by means of SEC-MALLS (Chi-san Wu, Handbook of size exclusion chromatography and related techniques, Volume 91, Chapter 21, Page 19).

A-ii: an alpha-methylstyrene-acrylonitrile copolymer with 30.5% acrylonitrile and 69.5% alpha-methylstyrene (CAS Number 98-83-9) having a molecular weight of 92 000 as measured by means of SEC-MALLS (Chi-san Wu, Handbook of size exclusion chromatography and related techniques, Page 19).

C-A-iii: a maleic anhydride-isoprene copolymer with a weight ratio of 1:1 of both components in a blend with a styrene-acrylonitrile copolymer with 25% acrylonitrile and 75% styrene. The maleic anhydride-isoprene copolymer and the styrene-acrylonitrile copolymer are each present at 50% by weight. The styrene-acrylonitrile copolymer has a molecular weight of 171 000 as measured by means of SEC-MALLS.

C-A-iv: a polystyrene sold commercially by BASF SE under the Polystyrol® 158K name.

As component B (or C-B for comparison), the following were used:

B-i: compound of the formula (III) to compound of the formula (IV) to compound of the formula (V) in a ratio of 1:2:60

B-ii: Compound of the formula (I) to compound of the formula (II) in a ratio of 3:1

C-B-iii Compounds of the formulae I, II, III, IV, and V in a ratio of 3:1:7:70:20

As component C (or C-C for comparison), the following were used:

C-i: a compound of the formula (VI), sold commercially by BASF SE under the Tinuvin® 770 name.

C-C-ii: a compound of the formula (XII), sold commercially by BASF SE under the Tinuvin® 765 name.

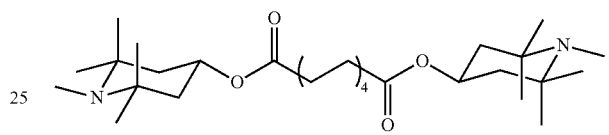

(XII)

As component D (or C-D for comparison), the following was used:

D-i: a compound of the formula (VII), sold commercially by Cytec Industries under the Cyasorb® 3853 name.

As component E (or C-E for comparison), the following were used:

E-i: a compound of the formula (VIII), sold commercially by BASF SE under the Chimassorb® 944 name.

E-ii: a compound of the formula (IX), sold commercially by Adeka under the Adeka Stab®LA-68 name.

E-iii: a compound of the formula (X), sold commercially by Cytec Industries under the Cyasorb® UV-3346 name.

As component F (or C-F for comparison), the following were used:

F-i: carbon black of type Black Pearls 880, sold commercially by Cabot Corporation F-ii: anthraquinone and pyrazolone yellow in a ratio of 2:1

Production of the molding compositions and moldings:

Components A, B, C, and D (for respective parts by weight see Table 1) were homogenized at 250° C. in a ZSK53 twin-screw extruder from Werner & Pfleiderer and extruded into a water bath. The extrudates were pelletized and dried. The pellets were used to produce test specimens on an injection molding machine at a melt temperature of 250° C. and mold surface temperature of 60° C., and the properties stated in Table 1 were ascertained.

TABLE 1

Composition and properties of the molding compositions (Examples beginning "C-" are comparative examples)

| Example | 1 | 2 | 3 | 4 | 5 | 6 | C-7 | C-8 | C-9 | C-10 | C-11 |
|---|---|---|---|---|---|---|---|---|---|---|---|
| Composition | | | | | | | | | | | |
| A-i | 96.2 | | 96.2 | 96.2 | 96.2 | | | | 97 | | 96.7 |
| A-ii | | 96.55 | | | | 96.55 | | | | 86.97 | |
| C-A-iii | | | | | | | 100 | | | | |

TABLE 1-continued

Composition and properties of the molding compositions (Examples beginning "C-" are comparative examples)

| Example | 1 | 2 | 3 | 4 | 5 | 6 | C-7 | C-8 | C-9 | C-10 | C-11 |
|---|---|---|---|---|---|---|---|---|---|---|---|
| C-A-iv | | | | | | | | 99.8 | | | |
| B-i | 0.8 | | 0.8 | 0.8 | 0.8 | | | | 0 | | 0.3 |
| B-ii | | 0.45 | | | | 0.45 | | | | | |
| C-B-iii | | | | | | | | | | 10.53 | |
| C-i: | 0.5 | 0.5 | 0.5 | 0.5 | 0.5 | 0.5 | | 0.1 | 0.5 | 0.5 | |
| C-C-ii | | | | | | | | | | | 0.5 |
| D-i | 0.5 | 0.5 | 0.25 | 0.25 | 0.25 | 0.25 | | | 0.5 | 0.5 | 0.5 |
| E-i | | 0.25 | | | | 0.25 | | 0.1 | | | |
| E-ii | | | | 0.25 | | | | | | | |
| E-iii | | | | | 0.25 | | | | | | |
| F-i | | | | | | 2 | | | 2 | | |
| F-ii | 2 | 2 | 2 | 2 | 2 | | 2 | | | 2 | 2 |
| Properties Gloss after | | | | | | | | | | | |
| 0 h WT | 101 | 103 | 101 | 102 | 101 | 104 | 102 | 101 | 102 | 101 | 99 |
| 1000 h WT | 91 | 103 | 94 | 93 | 92 | 103 | 0.5 | 7 | 60 | 53 | 57 |
| 1500 h WT | 62 | 101 | 63 | 62 | 65 | 99 | 1 | 1 | 7 | 4 | 2 |
| ΔE | | | | | | | | | | | |
| 0 h WT | 0 | 0 | 0 | 0 | 0 | 0 | 0 | 0 | 0 | 0 | 0 |
| 1000 h WT | 0.5 | 0.4 | 0.5 | 0.6 | 0.6 | 0.4 | 9.1 | 3.8 | 6.3 | 7.4 | 6.8 |
| 1500 h WT | 0.8 | 0.5 | 0.9 | 0.8 | 1.0 | 0.5 | 13.5 | 7.9 | 11.4 | 12.4 | 11.7 |

The examples demonstrate that the molding compositions of the invention, as compared with the known stabilized molding compositions, exhibit a further-improved weathering resistance, i.e., a further-improved heat, light and/or oxygen resistance. The composition is indicated in weight fractions, and the abbreviation WT stands for weathering time.

The invention claimed is:

1. A thermoplastic molding composition consisting of
a) 77.7% to 99.7% by weight of one or more styrene copolymers, as component A, wherein component A is a copolymer of acrylonitrile with styrene and/or α-methylstyrene wherein the weight fraction of acrylonitrile, based on component A, is at least 15% and not more than 40%,
b) 0.1% to 5% by weight of at least one compound selected from the group consisting of the formulae I, II, III, IV, V, and isomers thereof, as component B:

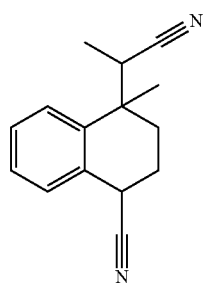

(I)

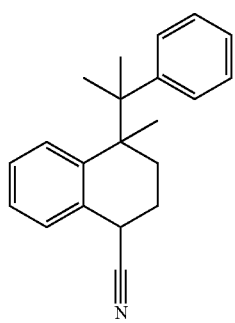

(II)

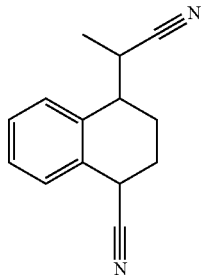

(III)

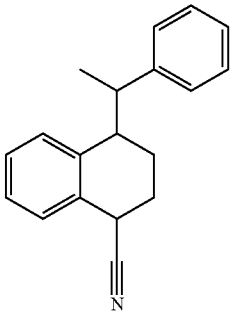

(IV)

(V)

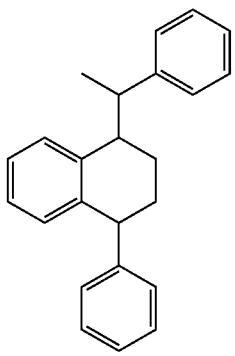

c) 0.2% to 0.7% by weight of a compound of the formula (VI), as component C:

(VI)

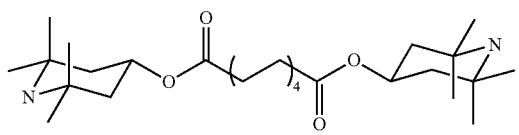

d) 0.2% to 0.7% by weight of a mixture of the formula (VII), as component D:

(VII)

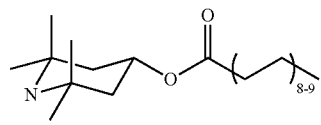

e) 0% to 0.5% by weight of a compound of the formula (VIII) as component E:

(VIII)

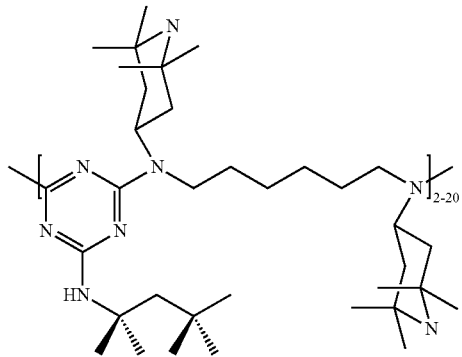

f) 0% to 10% by weight of one or more additives which are different from components C, D, and E, as component F, selected from the group consisting of dyes, pigments, colorants, antistats, antioxidants, stabilizers for improving heat stability, stabilizers for enhancing light stability, stabilizers for raising hydrolysis resistance and chemical resistance, agents which act against thermal decomposition, lubricants, and combinations thereof, and the percentage by weight being based in each case on the total weight of components A to F and together not exceeding 100% by weight, wherein the gloss of the composition, determined in accordance with DIN 67530 from a 60° viewing angle, after 1500 h weathering time is from 62 to 101, and wherein the weight ratio of component C to component D is in the range from 3:1 to 1:1.

2. The thermoplastic molding composition according to claim 1, wherein the weight fraction of component B is 0.2% to 2% by weight.

3. The thermoplastic molding composition according to claim 1, wherein the thermoplastic molding composition is used in the exterior area of motor vehicles.

4. The thermoplastic molding composition according to claim 3, wherein the thermoplastic molding composition is used in motor vehicles in column covers, spoilers, window surrounds, trim strips, cover hood, cover plates, as part of a radiator grill, aerial cover, side mirror or front and tail lights.

5. The thermoplastic molding composition according to claim 1, wherein components D and E are used in a weight ratio of 2:1 to 0.5:1.

6. The thermoplastic molding composition according to claim 1, wherein the weight ratio of component C to component D is in the range from 2:1 to 1:1.

7. The thermoplastic molding composition according to claim 6, wherein D is present in an amount of from 0.25 to 0.5% by weight.

8. A process for producing a molding with a high-gloss, chemical-resistant surface for the exterior area of motor vehicles which comprises utilizing the thermoplastic molding composition according to claim 1.

* * * * *